(12) United States Patent
Izawa

(10) Patent No.: US 7,756,349 B2
(45) Date of Patent: Jul. 13, 2010

(54) IMAGE PROCESSING APPARATUS AND COMPUTER-READABLE STORAGE MEDIUM

(75) Inventor: Shuichi Izawa, Fussa (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1143 days.

(21) Appl. No.: 11/389,866

(22) Filed: Mar. 27, 2006

(65) Prior Publication Data

US 2006/0215750 A1 Sep. 28, 2006

(30) Foreign Application Priority Data

Mar. 28, 2005 (JP) ............................. 2005-092490
Mar. 6, 2006 (JP) ............................. 2006-060157

(51) Int. Cl.
*G06K 9/36* (2006.01)
(52) U.S. Cl. ..................................... 382/239
(58) Field of Classification Search .................. 382/251, 382/239
See application file for complete search history.

(56) References Cited

U.S. PATENT DOCUMENTS

| 6,650,787 | B1 * | 11/2003 | Takahashi et al. ........... 382/251 |
| 6,697,567 | B1 * | 2/2004 | Suzuki ........................ 386/111 |
| 7,012,638 | B1 * | 3/2006 | Yokonuma ................ 348/220.1 |
| 2003/0081672 | A1 * | 5/2003 | Li ........................... 375/240.01 |

FOREIGN PATENT DOCUMENTS

| JP | 03-267877 | 11/1991 |
| JP | 08-237657 | 9/1996 |
| JP | 2001-069463 | 3/2001 |
| JP | 2002-199402 | 7/2002 |
| JP | 2003-023637 | 1/2003 |
| JP | 2003-032629 | 1/2003 |

OTHER PUBLICATIONS

Office Action dated Apr. 22, 2008 (with English translation) issued for the Japanese Patent Application No. 2006-060157.

* cited by examiner

*Primary Examiner*—Wenpeng Chen
(74) *Attorney, Agent, or Firm*—Cohen Pontani Lieberman & Pavane LLP

(57) ABSTRACT

Provided are an image processing apparatus and a computer-readable storage medium capable of adjusting to an optimum bit rate. In a case where an average bit rate is smaller than a target bit rate, a mobile communication terminal sets an encoding parameter for high image quality in an internal register of an encoding parameter manager to increase the bit rate. In a case where the average bit rate is larger than the target bit rate, the mobile communication terminal sets an encoding parameter for low image quality in the internal register of the encoding parameter manager to reduce the bit rate. Therefore, the mobile communication terminal can encode YUV data at an optimum bit rate.

5 Claims, 10 Drawing Sheets

ENCODING PARAMETER TABLE

| IMAGE SIZE | TARGET BIT RATE [kbps] | ENCODING PARAMETER | DEFAULT | HIGH IMAGE QUALITY | LOW IMAGE QUALITY |
|---|---|---|---|---|---|
| QVGA | 384 | QUANTIZATION SCALE | 5 | 2 | 10 |
| | | SPATIAL FILTER | 4 | 2 | 6 |
| | | ⋮ | ⋮ | ⋮ | ⋮ |
| QCIF AND SUB-QCIF | 64 | QUANTIZATION SCALE | 9 | 6 | 15 |
| | | SPATIAL FILTER | 6 | 6 | 8 |
| | | ⋮ | ⋮ | ⋮ | ⋮ |

FIG. 2

ENCODING PARAMETER TABLE

| IMAGE SIZE | TARGET BIT RATE [kbps] | | ENCODING PARAMETER (QUANTIZATION SCALE, SPATIAL FILTER, ···) | | |
|---|---|---|---|---|---|
| | UPPER LIMIT | LOWER LIMIT | MIDDLE IMAGE QUALITY | HIGH IMAGE QUALITY | LOW IMAGE QUALITY |
| QVGA | 336 | 432 | ··· | ··· | ··· |
| QCIF AND SUB-QCIF | 56 | 72 | ··· | ··· | ··· |

FIG. 5

ENCODING PARAMETER TABLE

| IMAGE SIZE | TARGET BIT RATE [kbps] | | ENCODING PARAMETER (QUANTIZATION SCALE, SPATIAL FILTER, ⋯) | | | |
|---|---|---|---|---|---|---|
| | UPPER LIMIT | LOWER LIMIT | 1 | 2 | ⋯ | N |
| QVGA | 336 | 432 | ⋯ | ⋯ | ⋯ | ⋯ |
| QCIF AND SUB−QCIF | 56 | 72 | ⋯ | ⋯ | ⋯ | ⋯ |

FIG. 8

IMAGE PROCESSING APPARATUS AND COMPUTER-READABLE STORAGE MEDIUM

BACKGROUND OF THE INVENTION

1. Field of the Invention

The present invention relates to an image processing apparatus and a computer-readable storage medium, and particularly relates to an image processing apparatus for adjusting a bit rate, and a computer-readable storage medium.

2. Description of the Related Art

Mobile communication terminals such as cellular phones, etc. have a phoning function as a telephone, and a function for sending and receiving e-mails. In addition, recent mobile communication terminals that have become common have a camera function for taking still images and moving images. The image data of the moving images captured by the camera function are coded at a fixed bit rate and stored in a storage medium such as a memory card, etc., as disclosed in, for example, Unexamined Japanese Patent Application KOKAI Publication No. 2003-32629.

Therefore, if the amount of movement of the photo-object is large, there occurs a problem that moving images of a satisfactory quality cannot be obtained because of a scarcer number of bits than needed. However, if the bit rate is set too high in order to prevent this problem, this in turn causes a problem of frame drop due to increase in the processing load of the CPU (Central Processing Unit). Furthermore, if the bit rate is set too high, there also arises a problem that a storage medium can only store a small amount of data.

SUMMARY OF THE INVENTION

The present invention was made in view of the above-described circumstance, and an object of the present invention is to provide an image processing apparatus capable of adjusting to an optimum bit rate, and a computer-readable storage medium.

To achieve the above object, an image processing apparatus according to a first aspect of the present invention comprises:

an encoded data generation unit which generates encoded data by encoding image data in accordance with a predetermined parameter; and a parameter adjusting unit which adjusts the predetermined parameter based on a bit rate of the encoded data generated by the encoded data generation unit, and the parameter adjusting unit includes:

a bit rate calculation unit which calculates an average bit rate in a predetermined period, from an amount of encoded data generated by the encoded data generation unit in the predetermined period;

a bit rate determination unit which determines whether the average bit rate calculated by the bit rate calculation unit is larger than a predetermined threshold or not; and a bit rate change unit which approximates the average bit rate to the predetermined threshold by adjusting the predetermined parameter based on a determination result of the bit rate determination unit.

In the above-described image processing apparatus, the bit rate change unit may reduce the bit rate by resetting the predetermined parameter to a parameter which will achieve a lower bit rate than achieved by a parameter currently set in a case where the bit rate determination unit determines that the average bit rate is larger than the predetermined threshold, and may increase the bit rate by resetting the predetermined parameter to a parameter which will achieve a higher bit rate than achieved by the parameter currently set in a case where the average bit rate is smaller than the predetermined threshold.

In the above-described image processing apparatus, the bit rate determination unit may include:

a first bit rate determination unit which determines whether the average bit rate calculated by the bit rate calculation unit is larger than a predetermined first threshold or not; and a second bit rate determination unit which determines whether the average bit rate calculated by the bit rate calculation unit is smaller or not than a predetermined second threshold smaller than the predetermined first threshold, and the bit rate change unit may reduce the bit rate by resetting the predetermined parameter to a parameter which will achieve a lower bit rate than achieved by a parameter currently set in a case where the first bit rate determination unit determines that the average bit rate is larger than the predetermined first threshold, and may increase the bit rate by resetting the predetermined parameter to a parameter which will achieve a higher bit rate than achieved by the parameter currently set in a case where the second bit rate determination unit determines that the average bit rate is smaller than the predetermined second threshold.

In the above-described image processing apparatus, the encoded data generation unit may include an adopted parameter storage unit in which a predetermined parameter to be adopted for generating encoded data is set, the parameter adjusting unit may include a stepped parameter storage unit which stores a plurality of predetermined parameters which will achieve different bit rates from each other when image data is encoded, and the bit rate change unit may read a predetermined parameter which will achieve a bit rate one step lower than achieved by the predetermined parameter set in the adopted parameter storage unit from the stepped parameter storage unit and reset the adopted parameter storage unit with the read parameter in a case where the first bit rate determination unit determines that the average bit rate is larger than the predetermined first threshold, and may read a predetermined parameter which will achieve a bit rate one step higher than achieved by the predetermined parameter set in the adopted parameter storage unit from the stepped parameter storage unit and reset the adopted parameter storage unit with the read parameter in a case where the second bit rate determination unit determines that the average bit rate is smaller than the predetermined second threshold.

In the above-described image processing apparatus, the parameter adjusting unit may start adjustment of the predetermined parameter in response to that capturing of a moving image is instructed, and terminate the adjustment of the predetermined parameter in response to that the capturing of a moving image is started.

In the above-described image processing apparatus, after the capturing of a moving image is started, the encoded data generation unit may encode image data obtained by the capturing of the moving image, in accordance with the predetermined parameter at a timing of starting the capturing.

A computer-readable storage medium according to a second aspect of the present invention stores a program for controlling a computer to execute:

an encoded data generation procedure for generating encoded data by encoding image data in accordance with a predetermined parameter;

a bit rate calculation procedure for calculating an average bit rate in a predetermined period, from an amount of encoded data generated by the encoded data generation procedure in the predetermined period;

a bit rate determination procedure for determining whether the average bit rate calculated by the bit rate calculation procedure is larger than a predetermined threshold or not; and a parameter adjustment procedure for adjusting the predetermined parameter based on a determination result by the bit rate determination procedure to approximate the average bit rate to the predetermined threshold.

According to the present invention, it is possible to adjust to an optimum bit rate.

BRIEF DESCRIPTION OF THE DRAWINGS

These objects and other objects and advantages of the present invention will become more apparent upon reading of the following detailed description and the accompanying drawings in which:

FIG. 2 is a diagram showing an example of the structure of an encoding parameter table according to the first embodiment of the present invention;

FIG. 5 is a diagram showing an example of the structure of an encoding parameter table according to a second embodiment of the present invention;

FIG. 8 is a diagram showing an example of the structure of an encoding parameter table according to a third embodiment of the present invention.

DETAILED DESCRIPTION OF THE PREFERRED EMBODIMENTS

The best mode for carrying out the present invention will now be explained in detail.

First, the specific structure of a mobile communication terminal according to a first embodiment of the present invention will be explained.

The mobile communication terminal according to the present embodiment is a terminal apparatus (telephone set) for mobile communication such as a cellular phone, a PHS (Personal Handyphone System), etc. The mobile communication terminal according to the present embodiment has a function for realizing wireless phone calls and sending and receiving of e-mails via a base station (unillustrated), a camera function for capturing still images and moving images with the use of an imaging element such as a CCD (Charge Coupled Device), etc. In addition, the mobile communication terminal according to the present embodiment is capable of sending and receiving e-mails with captured still images and moving images attached.

Figure 1:
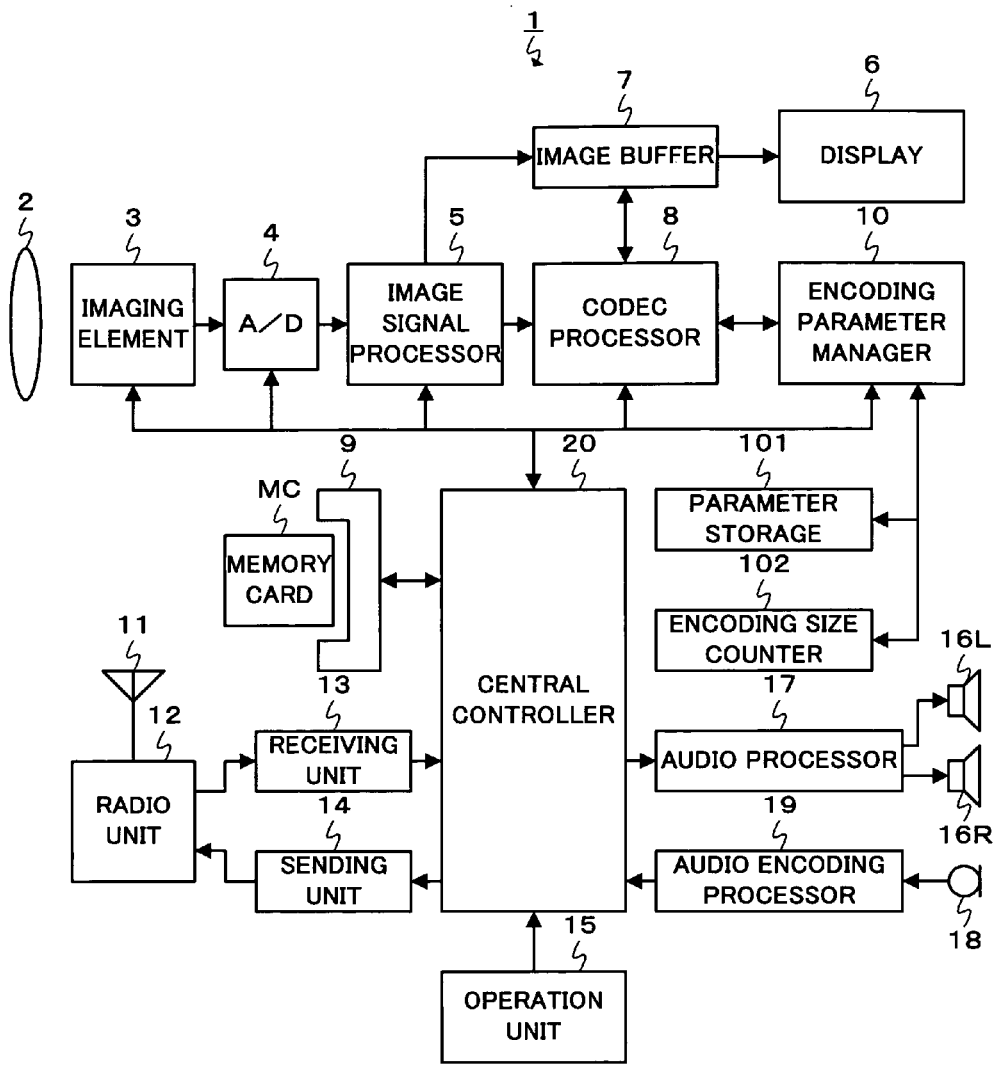
FIG. 1 is a block diagram showing an example of the structure of a mobile communication terminal according to a first embodiment of the present invention.

FIG. 1 is a block diagram showing an example of the structure of the mobile communication terminal according to the first embodiment of the present invention.

As shown in FIG. 1, the mobile communication terminal 1 comprises a lens optical system 2, an imaging element 3, an A/D (Analog/Digital) converter 4, an image signal processor 5, a display 6, an image buffer 7, a codec processor 8, a memory card connector 9, an encoding parameter manager 10, an antenna 11, a radio unit 12, a receiving unit 13, a sending unit 14, an operation unit 15, speakers 16L and 16R, an audio processor 17, a microphone 18, an audio encoding processor 19, a central controller 20, a parameter storage 101, and an encoding size counter 102.

The lens optical system 2 comprises an imaging lens, a focus lens for focus adjustment, a diaphragm for adjusting the amount of light from the photo-object reaching the imaging element 3, etc. The optical image (photo-object image) of the photo-object converging through the lens optical system 2 is focused on the imaging element 3.

The imaging element 3 is, for example, a CCD (Charge Coupled Device) or the like. The imaging element 3 stores the photo-object image focused through the lens optical system 2 by converting it (opto-electrically) into an electric charge having a level corresponding to the brightness of the image. The imaging element 3 outputs the stored electric charge as an imaging signal (analog signal), as scanned by a timing generator (unillustrated) and a V (Vertical) driver (unillustrated).

The imaging signal output from the imaging element 3 has the noise canceled by a CDS (Correlation Doubleness Sampling) circuit (unillustrated), then is amplified by an AGC (Automatic Gain Control) (unillustrated), and converted into a digital imaging signal by the A/D converter 4.

The image signal processor 5 comprises a color process circuit, a DMA (Direct Memory Access) controller, etc. The image signal processor 5 applies a color process to the digital imaging signal supplied from the A/D converter 4 at the color process circuit to generate YUV data. The image signal processor 5 transfers the YUV data generated at the color process circuit to a DRAM in the image buffer 7 by DMA, using the DMA controller.

The display 6 is constituted by, for example, an LCD (Liquid Crystal Display) or the like. The display 6 displays a through image, a reproduced image, etc., based on a video signal.

The image buffer 7 comprises, for example, a DRAM (Dynamic Random Access Memory) and a VRAM (Video Random Access Memory). The DRAM keeps the YUV data transferred by DMA from the image signal processor 5, or is used as a work memory for an encoding/decoding process of the YUV data at the codec processor 8.

The VRAM is used as a work memory when an image is displayed on the display 6. More specifically, the YUV data transferred by DMA to the DRAM from the image signal processor 5, or the YUV data decoded by the codec processor 8 is written in the VRAM. The YUV data written in the VRAM is read by the central controller 20 at regular intervals and converted into a video signal. As the video signal is supplied to the display 6, a through image, a reproduced image, etc. is displayed on the display 6.

The codec processor 8 applies an encoding process of, for example, the MPEG (Motion Picture Experts Group) 4 standard to the YUV data transferred by DMA to the DRAM in the image buffer 7, in accordance with an encoding parameter set in the encoding parameter manager 10. Thereby, the codec processor 8 generates encoded data of a still image or a moving image.

A memory card MC is, for example, an SD (Secure Digital) memory card, etc. A plurality of contact pads are formed on the front or rear surface of the memory card MC. The memory card MC stores the encoded data of the still image or moving image generated by the codec processor 8.

The memory card connector 9 has a plurality of contact terminals in the connector housing. Electrical connection between the mobile communication terminal 1 and the memory card MC is available through a contact between these contact terminals and the plurality of contact pads formed on the front or rear surface of the memory card MC.

The encoding parameter manager 10 has an internal register (unillustrated) for setting a target bit rate indicating an optimum bit rate encouraged for capturing of moving images by the mobile communication terminal 1, or an encoding parameter used for the encoding process at the codec processor 8. The encoding parameter manager 10 is connected to the parameter storage 101 and the encoding size counter 102.

The parameter storage 101 stores an encoding parameter table used for determining an encoding parameter at the time of capturing a moving image.

FIG. 2 is a diagram showing an example of the structure of the encoding parameter table.

As shown in FIG. 2, image size, target bit rate, and encoding parameter are registered in association in the encoding parameter table.

For example, a bit rate of 384 kbps is registered in the encoding parameter table as the target bit rate corresponding to the QVGA (Quarter Video Graphics Array) size (320×240 pixels), and a bit rate of 64 kbps is registered as the target bit rate corresponding to the QCIF (Quarter Common Intermediate Format) size (176×144 pixels) and Sub-QCIF size (128×96 pixels).

Further, three types of encoding parameters are registered for each image size in the encoding parameter table, namely a default encoding parameter, an encoding parameter for a high bit rate, i.e. for high image quality, and an encoding parameter for a low bit rate, i.e. for low image quality.

An encoding parameter includes a plurality of parameters such as a quantizing scale parameter, a spatial filter parameter, etc. For example, the quantization scale parameter indicates a step size for quantization, and the spatial filter parameter indicates the degree of spatial smoothing. The encoding parameter for each image quality is determined based on the combination of the plurality of parameters. The encoding parameter for each image quality may be one parameter of the plurality of parameters. The encoding parameter for each image quality may be appropriately determined in accordance with the image capturing characteristic of the mobile communication terminal 1 and registered in the encoding parameter table.

According to the present embodiment, the moving image to be sent or received by a movie e-mail is captured at the QCIF size or Sub-QCIF size low in pixel number, in order to compress the data amount. A moving image for video that is not to be sent or received by a movie e-mail is captured at the QVGA size high in pixel number, in order to raise the resolution.

The encoding size counter 102 counts the amount (bit number) of encoded data obtained during a predetermined period (for example, 1 second) at the codec processor 8.

The value counted by the encoding size counter 102 is used for, for example, calculating the bit rate.

The antenna 11 converts a radio wave externally input to the mobile communication terminal 1 into an analog signal. Further, the antenna 11 converts a transmission signal into a radio wave and radiates it into the air.

The radio unit 12 down-converts the analog signal supplied from the antenna 11, applies an orthogonal demodulation process and an A/D (Analog-Digital) conversion process to the down-converted analog signal to generate a digital signal at a chip rate, and supplies the generated digital signal to the receiving unit 13. Further, the radio unit 12 applies a D/A (Digital-Analog) conversion process and a modulation process to a transmission signal supplied from the sending unit 14, up-converts the transmission signal resulting from these processes, and sends the signal to a base station via the antenna 11. The receiving unit 13 applies an inverse spreading process and a phase correction process to the digital signal at the chip rate supplied from the radio unit 12 to obtain an audio signal at a symbol rate, and supplies the obtained audio signal to the audio processor 17.

The sending unit 14 applies an error correction encoding process, a process for mapping to a physical channel, and a spreading process to a transmission signal supplied from the audio encoding processor 19, and supplies the transmission signal resulting from these processes to the radio unit 12.

The operation unit 15 comprises, for example, a crosshair cursor key, alphanumeric character keys for typing numerals and characters, buttons for designating functions, etc. The operation unit 15 is operated by the user.

The speakers 16L and 16R output incoming voices or a ring tone in voice communications.

The audio processor 17 applies a decoding process to an audio signal supplied from the receiving unit 13, converts the decoded audio signal into an analog signal, and supplies it to the speakers 16L and 16R. As a result, for example, the voice of the communication partner is output from the speaker 16R and the ring tone is output from the speaker 16L.

The microphone 18 catches the voice uttered by the user in the voice communication.

The audio encoding processor 19 sequentially applies an A/D conversion process and an encoding process to the audio input from the microphone 18 to generate a transmission signal at a symbol rate, and supplies the generated transmission signal to the sending unit 14.

The central controller 20 comprises, for example, a CPU (Central Processing Unit), a ROM (Read Only Memory), a RAM (Random Access Memory), etc. With the CPU appropriately executing the programs stored in the ROM, etc., the central controller 20 controls the operation of each component of the mobile communication terminal 1. The RAM is used as a work memory when the CPU executes the programs.

Next, a specific operation of the mobile communication terminal 1 having the above-described structure will be explained.

Figure 3:
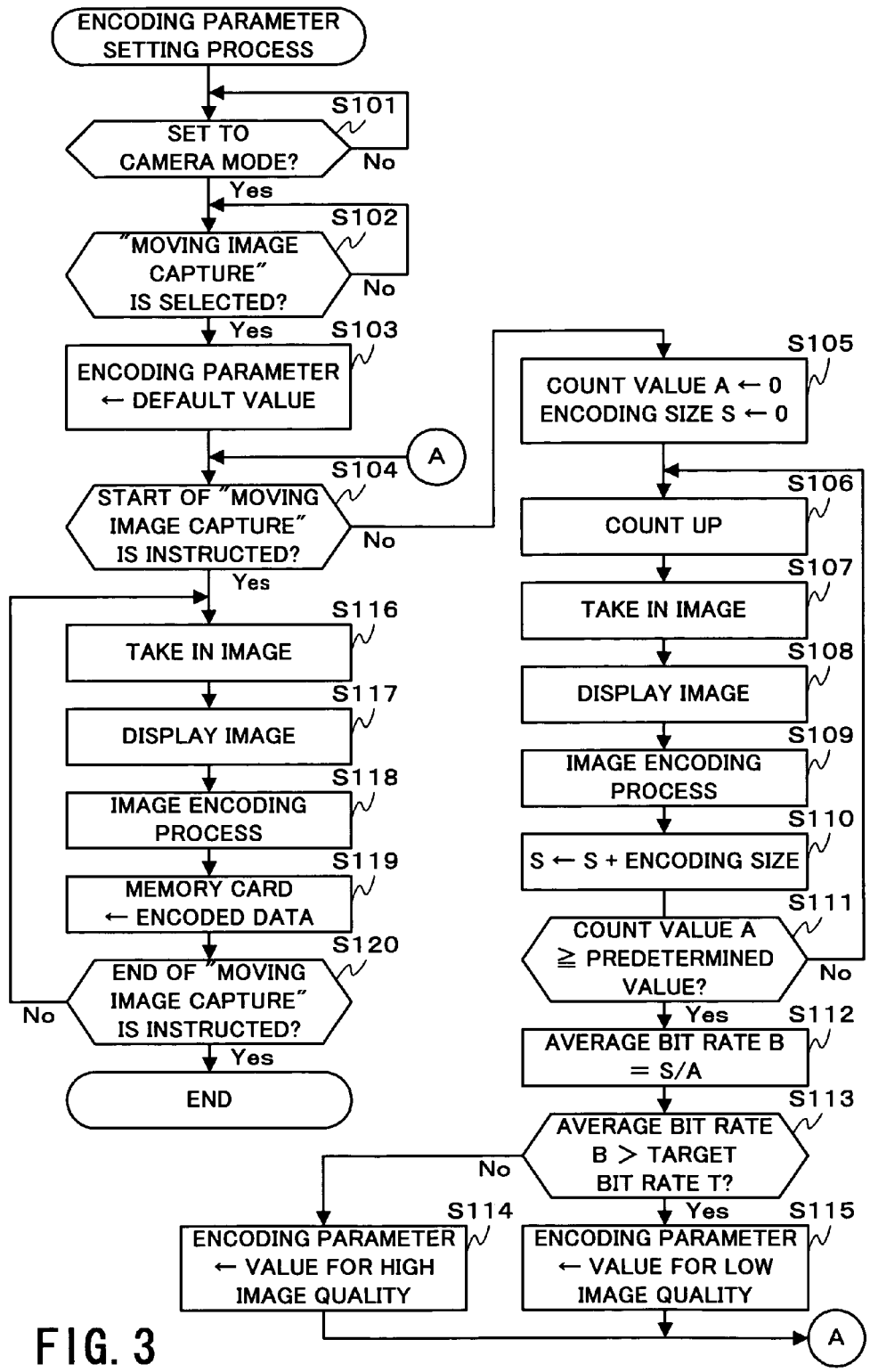
FIG. 3 is a flowchart showing an encoding parameter setting process by the mobile communication terminal according to the first embodiment of the present invention.

FIG. 3 is a flowchart showing an encoding parameter setting process by the mobile communication terminal 1 according to the first embodiment of the present invention.

Figure 4:
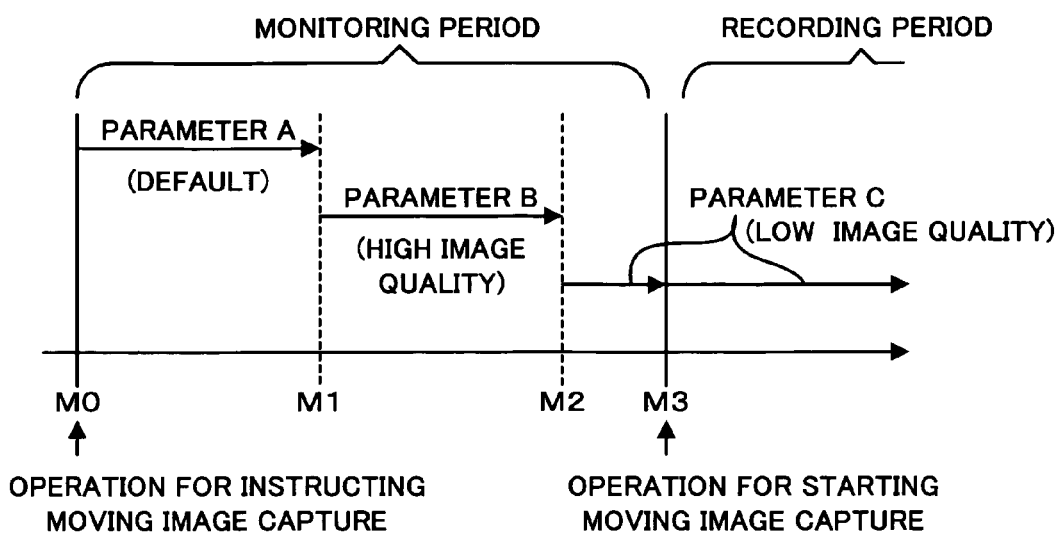
FIG. 4 is a timing chart for specifically explaining the content of the encoding parameter setting process.

FIG. 4 is a timing chart for specifically explaining the content of the encoding parameter setting process.

First, the central controller 20 determines whether or not the function mode is set to a camera mode by a user's operation, by referring to the level of input of a detection signal from the operation unit 15 or a function mode flag set or cleared in accordance with the function being executed (step S101). When the function mode is set to the camera mode by a user's operation (step S101; Yes), the central controller 20 displays a selection screen for allowing the user to select "still image capture" or "moving image capture" on the display 6.

The central controller 20 determines whether or not the "moving image capture" is selected by a user's operation corresponding to the display of the selection screen (step S102). If the user operates the operation unit 15 to select the "moving image capture" on the selection screen and then depress a "go" key, etc. thereby the "moving image capture" is selected (the "moving image capture" is instructed) (step S102; Yes), the central controller 20 specifies whether a recording mode is a video mode or a movie e-mail mode, by referring to a recording mode flag which is set or cleared in accordance with the type of the image to be recorded. Then, the central controller 20 obtains the default value of the encoding parameter and target bit rate corresponding to the image size of the specified recording mode, from the encoding parameter table stored in the parameter storage 101.

Then, the central controller 20 sets the obtained default value of the encoding parameter in the internal register (unillustrated) of the encoding parameter manager 10 (step S103).

To be more specific, when the recording mode is the video mode, the default value of the encoding parameter corresponding to the QVGA size is set. When the recording mode is the movie e-mail mode, the default value of the encoding parameter corresponding to the QCIF size or Sub-QCIF size is set.

Further, at this time, the obtained target bit rate is also set as target bit rate T in the internal register of the encoding parameter manager 10. Then, the central controller 20 determines whether or not the user has instructed the start of the "moving image capture" by, for example, depressing a recording button, by referring to the level of input of a detection signal from the operation unit 15 (step S104).

In a case where the user has not yet instructed the start of the "moving image capture" (step S104; No, M0 in FIG. 4), the central controller 20 determines that it is in a monitoring period, and sets a count value A of a timer provided in the RAM, etc. and the encoding size S of the encoding size counter 102 to an initial value "0" (step S105 in FIG. 3). Then, the central controller 20 starts the timer to upcount the count value A (step S106).

Then, the central controller 20 takes in an image (step S107). Specifically, the central controller 20 obtains an imaging signal corresponding to 1 frame from the imaging element 3 to have the color process circuit in the image signal processor 5 generate YUV data for 1 frame. This YUV data is transferred by DMA to the DRAM of the image buffer 7 by the DMA controller of the image signal processor 5. This process is repeated frame by frame.

Further, the central controller 20 writes the YUV data transferred by DMA to the DRAM in the VRAM. The central controller 20 reads the YUV data from the VRAM at each regular interval to generate a video signal, and supplies the generated video signal to the display 6. As a result, the taken image is displayed as a through image on the display 6 (step S108).

Further, the central controller 20 reads the YUV data from the image buffer 7, and applies the image encoding process to the YUV data at the codec processor 8 in accordance with the default encoding parameter set at step S103 to generate encoded data (step S109). Then, the central controller 20 adds the bit number (encoding size) of the generated encoded data to the stored value of the encoding size counter 102 to update the encoding size S (step S110).

Then, the central controller 20 refers to the count value A of the timer, and determines whether or not the count value A is equal to or greater than a predetermined value (step S111). Specifically, with the predetermined value assumed to be 1 second, the central controller 20 determines whether or not 1 second has passed after the timer was started at step S106. In a case where the count value A is smaller than the predetermined value, for example, in a case where the time that has elapsed from the start does not reach 1 second (step S111; No), the flow returns to step S106.

Thereafter, when the count value A becomes equal to or greater than the predetermined value, for example, when 1 second passes after the start (step S111; Yes), the central controller 20 divides the total bit number (encoding size S) stored in the encoding size counter 102 by the time that has passed indicated by the count value A to obtain the result of the division as an average bit rate B (step S112).

The central controller 20 compares the obtained average bit rate B with the target bit rate T set in the internal register of the encoding parameter manager 10 to determine whether or not the average bit rate B is greater than the target bit rate T (step S113).

In a case where it is determined at step S113 that the average bit rate B is not greater than the target bit rate T (step S113; No, M1 in FIG. 4), the central controller 20 determines that the amount of data that can be encoded per unit time still has room to grow, thereby raises the bit rate to improve the image quality. For this purpose, the central controller 20 reads the encoding parameter for high image quality from the encoding parameter table stored in the parameter storage 101, and sets the read encoding parameter in the internal register of the encoding parameter manager 10 (step S114 of FIG. 3). As a result, the encoding parameter is adjusted so that the image to be recorded will have a higher image quality.

For example, in a case where the photo-object has made few movements thereby to result in the average bit rate B of 200 kbps while the target bit rate T is 384 kbps, the encoding parameter is adjusted so that the bit rate will be increased. Therefore, the image to be recorded can have a higher image quality.

On the other hand, in a case where it is determined at step S113 that the average bit rate B is greater than the target bit rate T (step S113; Yes, M2 of FIG. 4), the central controller 20 reduces the bit rate to lower the image quality. Therefore, the central controller 20 reads the encoding parameter for low image quality from the encoding parameter table stored in the parameter storage 101, sets the read encoding parameter in the internal register of the encoding parameter manager 10 (step S115 of FIG. 3). As a result, it is possible to prevent a frame drop which might be caused due to an increase in the processing load of the central controller 20.

After the procedure at step S114 or step S115 is completed, the flow returns to step S104. The procedures at step S105 to S115 will be repeated until it is determined at step S104 that the start of the "moving image capture" is instructed.

In a case where it is determined at step S104 that the start of the "moving image capture" is instructed (the "moving image capture" is started) (step S104; Yes, M3 of FIG. 4), the central controller 20 determines that it is in a recording period, and takes in an image by performing the same procedure as that at step S107 described above (step S116 of FIG. 3). After this, the central controller 20 displays the taken image on the display 6 as a through image, by performing the same procedure as that at step S108 described above (step S117).

Then, the central controller 20 applies an image encoding process to YUV data to generate encoded data by performing the same procedure as that at step S109 described above in accordance with the encoding parameter adjusted through steps S105 to S115 (step S118).

Then, the central controller 20 stores the generated encoded data in the memory card MC (step S119). After this, the central controller 20 refers to the level of input of a detection signal from the operation unit 15, to determine whether or not the user instructs an end of the "moving image capture" (end of recording) (step S120). In a case where the user does not instruct the end of the "moving image capture" (step S120; No), the central controller 20 determines that the recording is to still continue, and returns to step S116.

In a case where it is determined at step S120 that the end of the "moving image capture" is instructed (step S120; Yes), the central controller 20 terminates the moving image capture operation to end the encoding parameter setting process.

The above-described process is the content of the encoding parameter setting process performed by the mobile communication terminal 1 of the present embodiment.

As explained above, in a case where the average bit rate before the recording of captured images is started is smaller than the target bit rate, the mobile communication terminal 1 of the present embodiment resets the internal register of the encoding parameter manager 10 with the encoding parameter for high image quality. Meanwhile, in a case where the average bit rate before the recording of captured images is started is greater than the target bit rate, the mobile communication terminal 1 of the present embodiment resets the internal register of the encoding parameter manager 10 with the encoding parameter for low image quality.

Since the encoding parameter is adjusted to increase the bit rate before the start of the recording in a case where the average bit rate is smaller than the target bit rate, it is possible to impart a higher image quality to the image to be recorded. In a case where the average bit rate is greater than the target bit rate, the encoding parameter is adjusted to reduce the bit rate before the recording is started. Therefore, it is possible to prevent a frame drop due to an increase in the processing load of the central controller 20, etc. Hence, the mobile communication terminal 1 can perform the encoding process of the YUV data at an optimum bit rate.

This encoding parameter adjustment is done during a period from when the user selects the "moving image capture" to when the user instructs the start of the "moving image capture". Then, after the moving image capture is started, the encoding process is performed on the YUV data of the moving image in accordance with the encoding parameter at the timing of the start.

Therefore, the mobile communication terminal 1 needs not to adjust the encoding parameter during the moving image capture, and can thus reduce the processing load of the central controller 20. Besides, the mobile communication terminal 1 can prevent an image blur which might be caused if the encoding parameter is adjusted many times.

Next, a second embodiment of the present invention will be explained.

According to the above-described first embodiment, the encoding parameter for high image quality or low image quality is set in accordance with the result of comparison between the average bit rate and the target bit rate at step S113. As compared with this, encoding parameters for three or more image qualities may be prepared, so that an encoding parameter for an image quality optimum for the image capture may be set from these parameters.

Hence, in the second embodiment, a case will be explained in which an encoding parameter for middle image quality is prepared in addition to high image quality and low image quality.

FIG. 5 is a diagram showing an example of the structure of an encoding parameter table according to the second embodiment of the present invention.

As shown in FIG. 5, the encoding parameter table according to the present embodiment registers a value for middle image quality, a value for high image quality, and a value for low image quality as the encoding parameters. The value for middle image quality is also used as a default value.

Further, the encoding parameter table registers two target bit rates indicating the range of an aimed bit rate, for each image size. Specifically, the encoding parameter table registers an upper limit bit rate as the upper limit of the range of the target bit rate, and a lower limit bit rate as the lower limit of the range. The range of, for example, an optimum bit rate encouraged for moving image capture by the mobile communication terminal 1 is registered as the range of the target bit rate.

Figure 6:
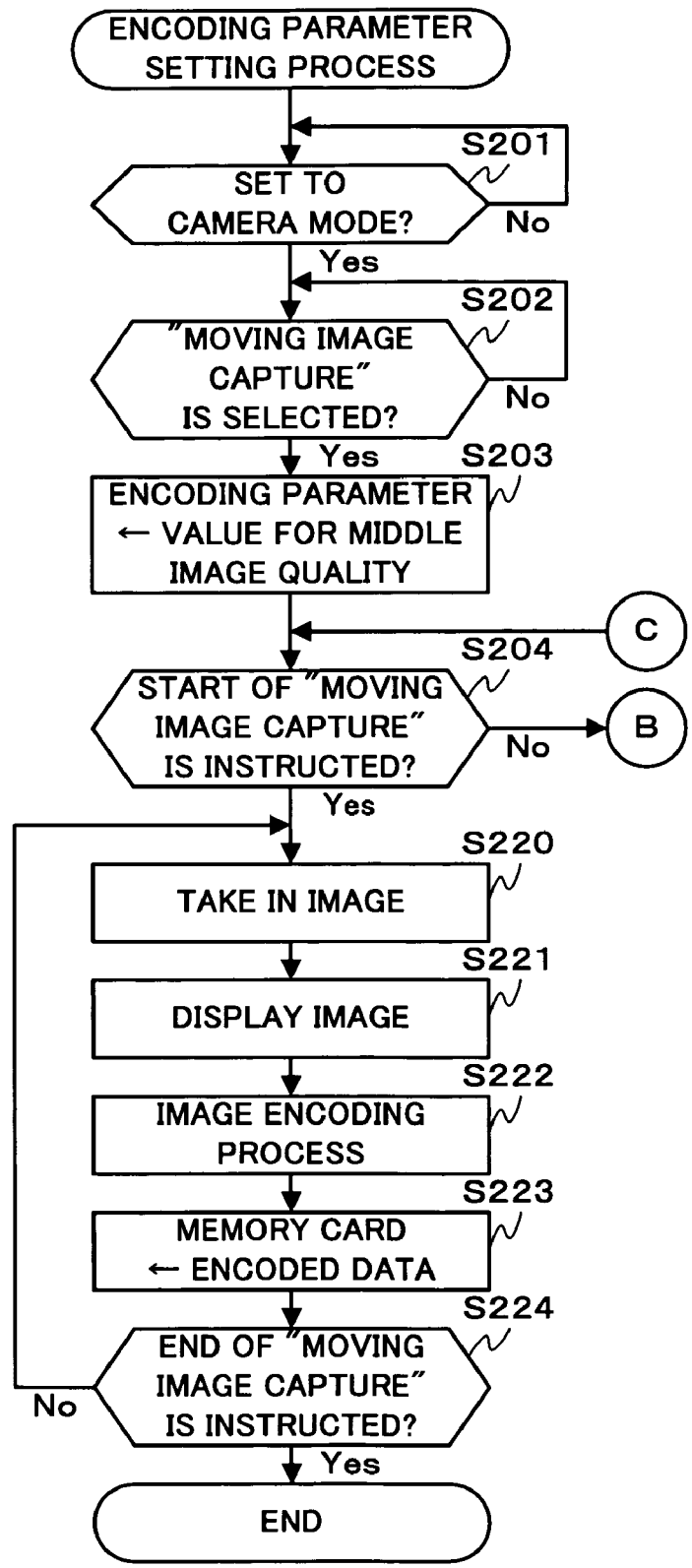
FIG. 6 and FIG. 7 are a flowchart showing an encoding parameter setting process by a mobile communication terminal according to the second embodiment of the present invention.
Figure 7:
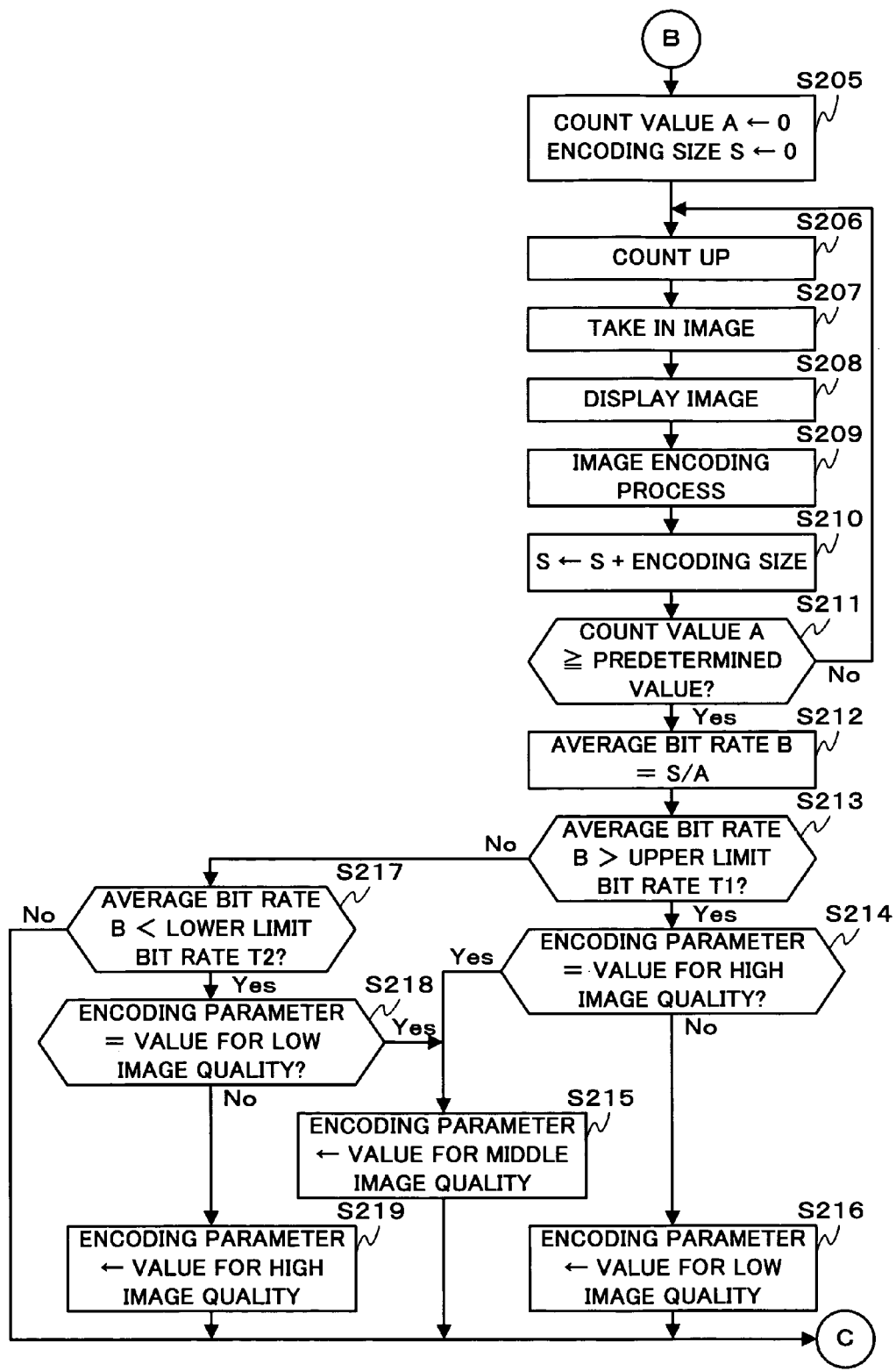

FIG. 6 and FIG. 7 are a flowchart showing an encoding parameter setting process performed by the mobile communication terminal 1 according to the second embodiment of the present invention.

In this flowchart, explanation of procedures same as those in the flowchart shown in FIG. 3 will be omitted.

First, the central controller 20 performs the same procedures as those at step S101 and step S102 of FIG. 3 to determine whether the "moving image capture" is selected or not in the camera mode (steps S201 and S202 of FIG. 6). When the "moving image capture" is selected (step S202; Yes), the central controller 20 specifies whether the recording mode is the video mode or the movie e-mail mode. In the following procedures, the information registered in the encoding parameter table in association with the image size for the recording mode specified here will be used. Then, the central controller 20 obtains the value of the encoding parameter for middle image quality, the upper limit bit rate, and the lower limit bit rate from the encoding parameter table shown in FIG. 5 stored in the parameter storage 101.

Then, the central controller 20 sets the obtained value of the encoding parameter for middle image quality in the internal register of the encoding parameter manager 10 as the default value (step S203).

At this time, also the obtained upper limit bit rate and lower limit bit rate are set in the internal register of the encoding parameter manager 10 as the upper limit bit rate T1 and lower limit bit rate T2.

Then, the central controller 20 determines whether the start of the "moving image capture" is instructed or not (step S204). In a case where the start of the "moving image capture" is not instructed (step S204; No), the central controller 20 determines that it is in a monitoring period, and obtains an average bit rate B by performing the same procedures as those at steps S105 to S112 of FIG. 3 in accordance with the encoding parameter set in the internal register of the encoding parameter manager 10 (steps S205 to S212 of FIG. 7).

The central controller 20 compares the obtained average bit rate B with the upper limit bit rate T1 set in the internal register of the encoding parameter manager 10 to determine whether the average bit rate B is greater than the upper limit bit rate T1 or not (step S213).

In a case where it is determined at step S213 that the average bit rate B is greater than the upper limit bit rate T1 (step S213; Yes), the central controller 20 determines whether the encoding parameter set in the internal register of the encoding parameter manager 10 is the value for high image quality or not (step S214). In a case where the encoding parameter is the value for high image quality (step S214; Yes), the central controller 20 sets the encoding parameter for middle image quality in the internal register of the encoding parameter manager 10 (step S215). To the contrary, in a case where the encoding parameter is not the value for high image quality, i.e. in a case where it is the value for middle image quality or low image quality (step S214; No), the central controller 20 sets the encoding parameter for low image quality in the internal register of the encoding parameter manager 10 (step S216).

By the procedures at steps S214 to S216, the encoding parameter is changed to a value for image quality one level down, in a case where the average bit rate is greater than the range of the target bit rate. Accordingly, the bit rate is lowered, and the average bit rate can be approximated to the range of the target bit rate. In a case where the encoding parameter for low image quality that requires the smallest bit rate has already been set, this setting will be maintained.

In a case where it is determined at step S213 that the average bit rate B is equal to or smaller than the upper limit bit rate T1 (step S213; No), the central controller 20 compares the average bit rate B with the lower limit bit rate T2 set in the internal register of the encoding parameter manager 10 to determine whether the average bit rate B is smaller than the lower limit bit rate T2 or not (step S217).

In a case where it is determined at step S217 that the average bit rate B is smaller than the lower limit bit rate T2 (step S217; Yes), the central controller 20 determines whether the encoding parameter set in the internal register of the encoding parameter manager 10 is the value for low image quality or not (step S218). In a case where the encoding parameter is the value for low image quality (step S218; Yes), the central controller 20 sets the encoding parameter for middle image quality in the internal register of the encoding parameter manager 10 (step S215). To the contrary, in a case where the encoding parameter is not the value for low image quality, i.e., in a case where it is the value for middle image quality or high image quality (step S218; No), the central controller 20 sets the encoding parameter for high image quality in the internal register of the encoding parameter manager 10 (step S219).

By the procedures at steps S218, S215, and S219, the setting of the encoding parameter is changed to the value for image quality one level up if the average bit rate is smaller than the range of the target bit rate. As a result, the bit rate is increased, and the average bit rate can be approximated to the range of the target bit rate. If the encoding parameter for high image quality with the highest bit rate has already been set, this setting will be maintained.

In a case where it is determined at step S217 that the average bit rate B is equal to or greater than the lower limit bit rate T2 (step S217; No), the value of the encoding parameter set in the internal register of the encoding parameter manager 10 is not changed and the flow returns to step S204 of FIG. 6. Therefore, in a case where the average bit rate is within the range of the target bit rate, the setting of the encoding parameter will be maintained, and the optimum bit rate that is encouraged will be maintained.

When the encoding parameter is set through the procedures at steps S213 to S219 of FIG. 7, the flow returns to step S204 of FIG. 6. The procedures at steps S205 to S219 of FIG. 7 will be repeated until it is determined at step S204 of FIG. 6 that the start of the "moving image capture" is instructed.

When it is determined at step S204 that the start of the "moving image capture" is instructed (step S204; Yes), the central controller 20 determines that it is in a recording period, and performs the moving image capturing operation by performing the same procedures as those at steps S116 to S120 of FIG. 3 in accordance with the encoding parameter set by the procedures at steps S213 to S219 of FIG. 7 (steps S220 to S224 of FIG. 6), and then terminates the encoding parameter setting process.

As explained above, according to the present embodiment, the value of the encoding parameter for the moving image capture is adjusted such that the average bit rate is approximated to the target bit rate, based on the average bit rate of the images before moving image capture (recording). Specifically, in a case where the average bit rate is larger than a predetermined range, an encoding parameter for an image quality lower than that currently set is set in order to lower the bit rate. In a case where the average bit rate is smaller than the predetermined range, an encoding parameter for an image quality higher than that currently set is set in order to raise the bit rate. Furthermore, in a case where the average bit rate is within the predetermined range, the setting of the encoding parameter is not changed, so that the bit rate will be maintained.

Therefore, for example, in a case where the amount of movements of the photo-object to be captured is large and the average bit rate is therefore larger than the predetermined range, the capturing will be performed at an image quality that will reduce the bit rate, making it possible to prevent a frame drop and a shrink of time duration for moving image capture. In a case where the average bit rate is smaller than the predetermined range, the image capture will be performed at an image quality that will raise the bit rate, making it possible to provide the user with a moving image with a higher image quality by utilizing the room of the bit rate. In a case where the average bit rate is within the predetermined range, the image capture can be performed at an optimum bit rate encouraged for moving image capture by the mobile communication terminal 1.

According to the present embodiment, an image quality that will achieve the optimum bit rate is selected from middle image quality, high image quality, and low image quality in accordance with the amount of movements, etc. of the photo-object before the image capture, enabling the bit rate for moving image capture to be adjusted to the optimum bit rate.

Next, a third embodiment of the present invention will be explained.

According to the third embodiment of the present invention, a case will be explained in which encoding parameters for N kinds of image qualities (where N being an arbitrary natural number) are prepared.

FIG. 8 is a diagram showing an example of the structure of an encoding parameter table according to the third embodiment of the present invention.

The encoding parameter table according to the present embodiment registers encoding parameters for N kinds of image qualities, as shown in FIG. 8. Identification numbers of 1 to N are previously given to the encoding parameters in the encoding parameter table in the order of the parameter for the lowest image quality to those higher. Further, the encoding parameter table registers an upper limit bit rate as the upper limit of the range of a target bit rate and a lower limit bit rate as the lower limit of the range, for each image size.

Figure 9:
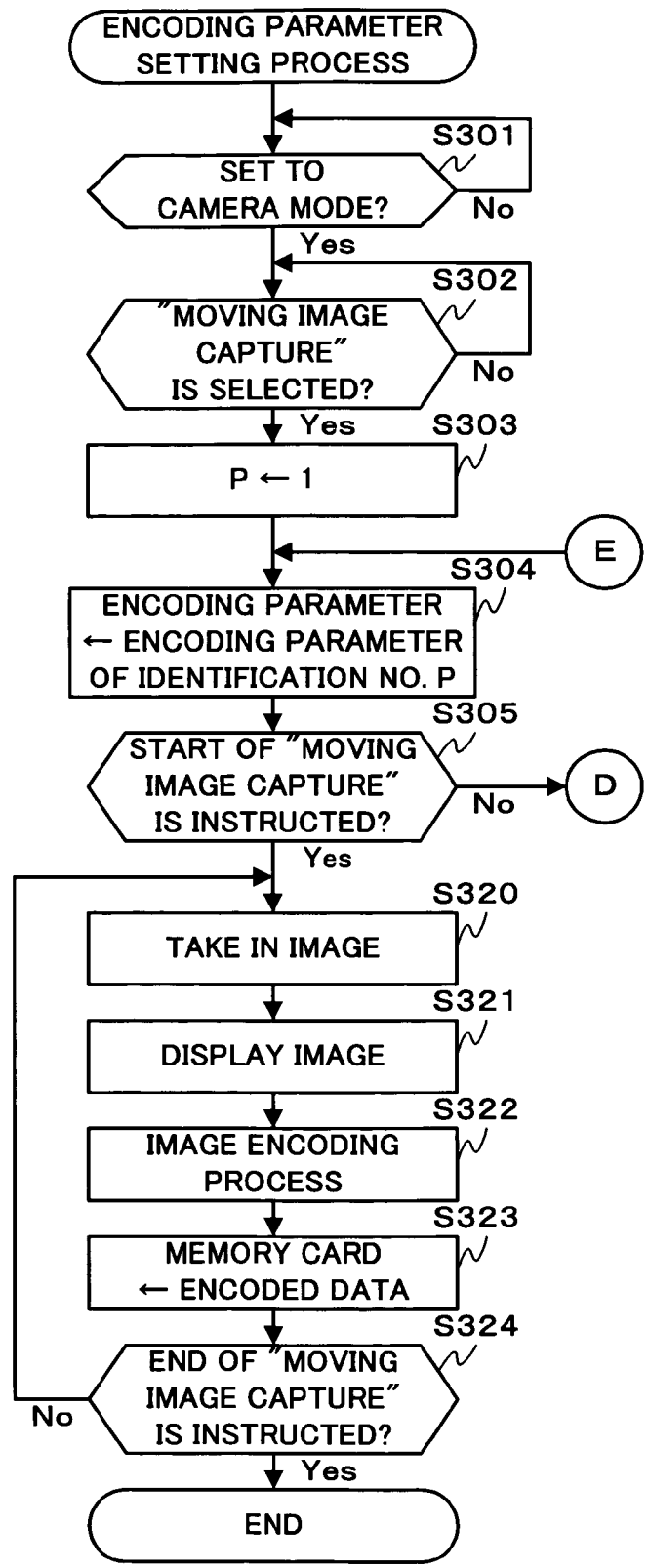
FIG. 9 and FIG. 10 are a flowchart showing an encoding parameter setting process by a mobile communication terminal according to the third embodiment of the present invention.
Figure 10:
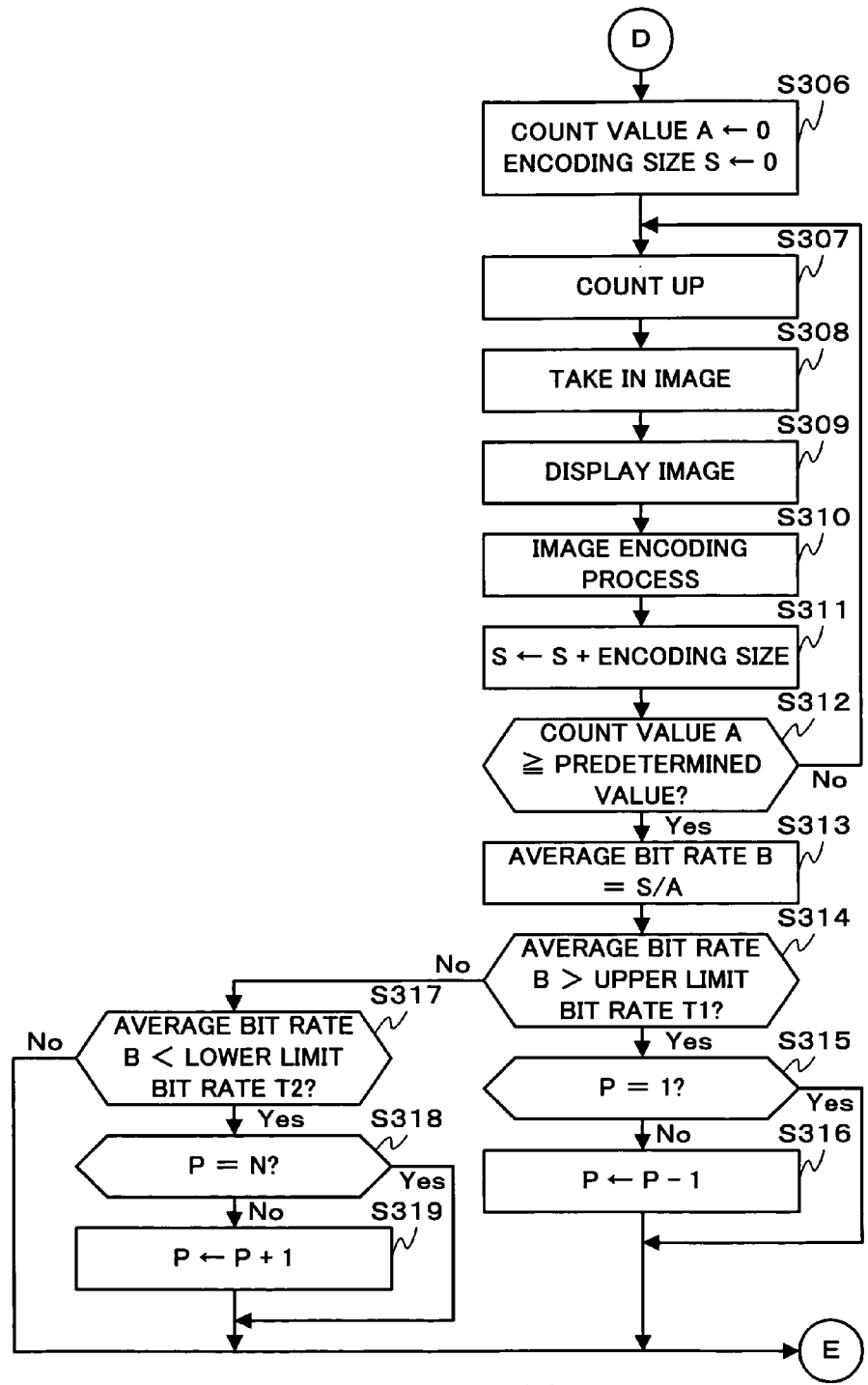

FIG. 9 and FIG. 10 are a flowchart showing an encoding parameter setting process performed by the mobile communication terminal 1 according to the third embodiment of the present invention.

In this flowchart, explanation for the procedures same as those in the flowchart shown in FIG. 3 will be omitted.

First, the central controller 20 determines whether the "moving image capture" is selected or not in the camera mode, by performing the same procedures as those at steps S101 and S102 of FIG. 3 (steps S301 and S302 of FIG. 9). When the "moving image capture" is selected (step S302; Yes), the central controller 20 sets "1" to a variable P stored in the encoding parameter manager 10 as a default value (step S303). The value of the variable P set herein may be another value among 1 to N. Next, the central controller 20 specifies whether the recording mode is the video mode or the movie e-mail mode. In the following procedures, the information registered in the encoding parameter able in association with the image size for a recording mode specified herein will be used. Then, the central controller 20 obtains an encoding parameter having an identification number P same as the value of the variable P, the upper limit bit rate, and the lower limit bit rate from the encoding parameter table shown in FIG. 8 stored in the parameter storage 101.

Then, the central controller 20 sets the obtained encoding parameter having the identification number P in the internal register of the encoding parameter manager 10 (step S304).

At this time, also the obtained upper limit bit rate and lower limit bit rate are set in the internal register of the encoding parameter manager 10 as the upper limit bit rate T1 and lower limit bit rate T2.

Then, the central controller 20 determines whether the start of the "moving image capture" is instructed or not (step S305). In a case where the start of the "moving image capture" is not instructed (step S305; No), the central controller 20 determines that it is in a monitoring period, and obtains the average bit rate B by performing the same procedures as those at steps S105 to S112 of FIG. 3 in accordance with the encoding parameter set in the internal register of the encoding parameter manager 10 (steps S306 to S313 of FIG. 10).

Then, the central controller 20 compares the obtained average bit rate B with the upper limit bit rate T1 set in the internal register of the encoding parameter manager 10, to determine whether the average bit rate B is larger than the upper limit bit rate T1 or not (step S314).

In a case where it is determined at step S314 that the average bit rate B is larger than the upper limit bit rate T1 (step S314; Yes), the central controller 20 determines whether it is P=1 or not (step S315). In a case where it is not P=1 (step S315; No), the central controller 20 decrements the value of P by 1 (step S316). To the contrary, in a case here it is P=1 (step S315; Yes), the central controller 20 skips step S316 so as not to decrement the value of P any more.

In a case where it is determined at step S314 that the average bit rate B is equal to or smaller than the upper limit bit rate T1 (step S314; No), the central controller 20 compares the average bit rate B with the lower limit bit rate T2 set in the internal register of the encoding parameter manager 10 to determine whether the average bit rate B is smaller than the lower limit bit rate T2 or not (step S317).

In a case where it is determined at step S317 that the average bit rate B is smaller than the lower limit bit rate T2 (step S317; Yes), the central controller 20 determines whether it is P=N or not (step S318). In a case where it is not P=N (step S318; No), the central controller 20 increments the value of P by 1 (step S319). To the contrary, in a case where it is P=N (step S318; Yes), the central controller 20 skips step S319 so as not to increment the value of P any more.

In a case where it is determined at step S317 that the average bit rate B is equal to or larger than the lower limit bit rate T2 (step S317; No), the value of P will no be changed and the flow returns to step S304 of FIG. 9.

When the value of P is set through the procedures at steps S314 to S319 of FIG. 10, the flow returns to step S304 of FIG. 9. Then, the central controller 20 obtains the encoding parameter having the identification number P same as the value of the variable P set by the procedures at steps S314 to S319 of FIG. 10 from the encoding parameter table shown in FIG. 8, and resets the internal register of the encoding parameter manager 19 with the obtained encoding parameter (step S304 of FIG. 9).

Then, the central controller 20 determines whether the start of the "moving image capture" is instructed or not (step S305). The procedures at steps S314 to S319 of FIG. 10 and the procedure at step S304 of FIG. 9 will be repeated until the start of the "moving image capture" is instructed.

Through this repetitive process, in a case where the average bit rate is larger than the range of the target bit rate, the value of P is decremented by 1 so that the encoding parameter is changed to a value for an image quality one level down. As a result, the bit rate is reduced, and the average bit rate can be approximated to the range of the target bit rate. In a case where the average bit rate is smaller than the range of the target bit rate, the value of P is incremented by 1 so that the encoding parameter is changed to a value for an image quality one level up. As a result, the bit rate is increased, and the average bit rate can be approximated to the range of the target bit rate. Further, in a case where the average bit rate is within the range of the target bit rate, the value of P is not changed and the setting of the encoding parameter is maintained. Therefore, the optimum bit rate encouraged can be maintained.

When it is determined at step S305 that the start of the "moving image capture" is instructed (step S305; Yes), the central controller 20 determines that it is in a recording period, and performs the moving image capturing operation by performing the same procedures as those at steps S116 to S120 of FIG. 3 in accordance with the encoding parameter set by the procedure at step S304 of FIG. 9 (steps S320 to S324), and terminates this encoding parameter setting process.

As explained above, according to the present embodiment, encoding parameters for an arbitrary number of kinds of image qualities are stored. In a case where the average bit rate of the images before the moving image capture (recording) is off the range of the target bit rate indicating the optimum bit rate, the image quality is changed sequentially so that the average bit rate is approximated to the target bit rate, and the encoding parameter for the changed image quality is set as the encoding parameter for recording.

Hence, according to the present embodiment, an encoding parameter for an image quality that will achieve the optimum bit rate for the moving image capture is set from the encoding parameters for the arbitrary number of kinds of image qualities. Therefore, the bit rate for moving image capture can be adjusted to the optimum bit rate.

According to the present embodiment, the central controller 20 may not increment or decrement the value of the variable P by 1, but may increment or decrement the value by a value corresponding to the difference between the average bit rate and the target bit rate. According to this manner, the average bit rate can be approximated to the target bit rate in a shorter period of time.

The present invention is not limited to the above-described first to third embodiments, but can be modified or applied in various manners. Modifications of the above-described embodiments applicable to the present invention will now be explained.

According to the above-described embodiments, the explanation has been given by applying the image processing apparatus of the present invention to a mobile communication terminal. However, the image processing apparatus of the present invention may be applied to a digital camera.

The structure of the encoding parameter manager 10 according to the above-described embodiments can be realized by hardware, and may also be realized by software processing by the central controller 20. In this case, a program for controlling the central controller 20 to function as the encoding parameter manager 10 to realize the above-described processes may be stored in the mobile communication terminal 1 (for example, in the ROM thereof), so that the central controller 20 will execute the program According to the above-described embodiments, the program executed by the CPU of the central controller 20 is pre-stored in the ROM, etc. However, the present invention is not limited to this, but the program for realizing the above-described processes may be applied to an existing mobile communication terminal, in order to have this existing terminal function as the mobile communication terminal 1 according to the above-described embodiments.

The method for providing such a program is arbitrary. For example, the program may be provided through a communication medium such as the Internet, or may be stored and distributed in a storage medium such as a CD-ROM, a memory card, etc.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-92490 filed on Mar. 28, 2005 and No. 2006-60157 filed on Mar. 6, 2006 and including specification, claims, drawings and summary. The disclosure of the above Japanese Patent Application is incorporated herein by reference in its entirety.

What is claimed is:

1. An image processing apparatus which has functions for capturing a still image and a moving image, comprising:
   a moving image capture selection determination unit which determines whether a moving image capture mode is selected or not;
   a moving image capture start determination unit which determines whether a start of a moving image capture is instructed or not in the moving image capture mode;
   an encoded data generation unit which generates encoded data by encoding image data in accordance with a predetermined parameter;
   a parameter adjusting unit which adjusts the predetermined parameter by selecting a predetermined parameter from a plurality of registered predetermined parameters based on a bit rate of the encoded data generated by the encoded data generation unit, and
   a moving image capture control unit which causes the parameter adjusting unit to start adjustment of the predetermined parameter in response to a determination by the moving image capture selection determination unit that the moving image capture mode is selected, causes the parameter adjusting unit to repeat the adjustment of the predetermined parameter while the moving image capture start determination unit determines that a start of a moving image capture is not instructed in the moving image capture mode, causes the parameter adjusting unit to terminate the adjustment of the predetermined parameter in response to a determination by the moving image capture start determination unit that a start of a moving image capture is instructed in the moving image capture mode, and causes the encoded data generation unit, after the capturing of a moving image is started, to encode image data obtained by the capturing of the moving image, in accordance with the predetermined parameter at a timing of terminating the adjustment,
   wherein the parameter adjusting unit includes:
       a bit rate calculation unit which calculates an average bit rate in a predetermined period, from an amount of encoded data generated by the encoded data generation unit in the predetermined period;
       a bit rate determination unit which determines whether the average bit rate calculated by the bit rate calculation unit is larger than a predetermined threshold or not; and
       a bit rate change unit which changes a bit rate by selecting a predetermined parameter from the plurality of registered predetermined parameters to approximate the average bit rate to the predetermined threshold based on a determination result of the bit rate determination unit.

2. The image processing apparatus according to claim 1, wherein the bit rate change unit reduces the bit rate by resetting the predetermined parameter to a parameter which will achieve a lower bit rate than achieved by a parameter currently set in a case where the bit rate determination unit determines that the average bit rate is larger than the predetermined threshold, and increases the bit rate by resetting the predetermined parameter to a parameter which will achieve a higher bit rate than achieved by the parameter currently set in a case where the average bit rate is smaller than the predetermined threshold.

3. The image processing apparatus according to claim 1, wherein the bit rate determination unit includes:
   a first bit rate determination unit which determines whether the average bit rate calculated by the bit rate calculation unit is larger than a predetermined first threshold or not; and
   a second bit rate determination unit which determines whether the average bit rate calculated by the bit rate calculation unit is smaller or not than a predetermined second threshold smaller than the predetermined first threshold, and
   the bit rate change unit reduces the bit rate by resetting the predetermined parameter to a parameter which will achieve a lower bit rate than achieved by a parameter currently set in a case where the first bit rate determination unit determines that the average bit rate is larger than the predetermined first threshold, and increases the bit rate by resetting the predetermined parameter to a parameter which will achieve a higher bit rate than achieved by the parameter currently set in a case where the second bit rate determination unit determines that the average bit rate is smaller than the predetermined second threshold.

4. The image processing apparatus according to claim 3, wherein
   the encoded data generation unit includes an adopted parameter storage unit in which a predetermined parameter to be adopted for generating encoded data is set,
   the parameter adjusting unit includes a stepped parameter storage unit which stores a plurality of predetermined parameters which will achieve different bit rates from each other when image data is encoded as the plurality of registered predetermined parameters, and
   the bit rate change unit reads a predetermined parameter which will achieve a bit rate one step lower than achieved by the predetermined parameter set in the adopted parameter storage unit from the stepped parameter storage unit and resets the adopted parameter storage unit with the read parameter in a case where the first bit rate determination unit determines that the average bit rate is larger than the predetermined first threshold, and reads a predetermined parameter which will achieve a bit rate one step higher than achieved by the predetermined parameter set in the adopted parameter storage unit from the stepped parameter storage unit and resets the adopted parameter storage unit with the read parameter in a case where the second bit rate determination unit determines that the average bit rate is smaller than the predetermined second threshold.

5. A computer-readable storage medium storing a program for controlling a computer which has functions for capturing a still image and a moving image to execute:

a moving image capture selection determination procedure for determining whether a moving image capture mode is selected or not;

a moving image capture start determination procedure for determining whether a start of a moving image capture is instructed or not in the moving image capture mode;

an encoded data generation procedure for generating encoded data by encoding image data in accordance with a predetermined parameter;

a bit rate calculation procedure for calculating an average bit rate in a predetermined period, from an amount of encoded data generated by the encoded data generation procedure in the predetermined period;

a bit rate determination procedure for determining whether the average bit rate calculated by the bit rate calculation procedure is larger than a predetermined threshold or not;

a parameter adjustment procedure for adjusting the predetermined parameter by selecting a predetermined parameter from a plurality of registered predetermined parameters to approximate the average bit rate to the predetermined threshold based on a determination result by the bit rate determination procedure; and a moving image capture control procedure for starting adjustment of the predetermined parameter in response to a determination by the moving image capture selection determination procedure that the moving image capture mode is selected, repeating the adjustment of the predetermined parameter while the moving image capture start determination procedure determines that a start of a moving image capture is not instructed in the moving image capture mode, terminating the adjustment of the predetermined parameter in response to a determination by the moving image capture start determination procedure that a start of a moving image capture is instructed in the moving image capture mode and, after the capturing of a moving image is started, encoding image data obtained by the capturing of the moving image, in accordance with the predetermined parameter at a timing of terminating the adjustment.

* * * * *